US012417656B2

(12) United States Patent
Morris et al.

(10) Patent No.: US 12,417,656 B2
(45) Date of Patent: Sep. 16, 2025

(54) DETECTION OF TIRE RADIUS MISMATCH (71) Applicant: The Goodyear Tire & Rubber Company, Akron, OH (US)

(72) Inventors: Brian Richard Morris, Canton, OH (US); Marjan Moro, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 137 days.

(21) Appl. No.: 18/507,137

(22) Filed: Nov. 13, 2023

(65) Prior Publication Data

US 2024/0194006 A1 Jun. 13, 2024

Related U.S. Application Data (60) Provisional application No. 63/386,323, filed on Dec. 7, 2022.

(51) Int. Cl.
*G07C 5/08* (2006.01)

(52) U.S. Cl.
CPC .................. *G07C 5/0808* (2013.01)

(58) Field of Classification Search
CPC ....... G07C 5/0808; B60C 23/20; B60C 23/00; B60C 11/246
See application file for complete search history.

(56) References Cited

U.S. PATENT DOCUMENTS

| 2,526,056 | A | 10/1950 | Weston |
| 2,566,407 | A | 9/1951 | Evans |
| 2,566,435 | A | 9/1951 | Trimmer |
| 2,841,874 | A | 7/1958 | Richardson |
| 3,783,523 | A | 1/1974 | Smith |
| 4,630,470 | A | 12/1986 | Brooke et al. |
| 11,203,235 | B2 | 12/2021 | Haronian |
| 2010/0256946 | A1 | 10/2010 | Carresjoe et al. |
| 2011/0043343 | A1 | 2/2011 | Shepler et al. |
| 2014/0277910 | A1 | 9/2014 | Suh et al. |
| 2020/0130437 | A1 | 4/2020 | Root et al. |
| 2020/0231010 | A1 | 7/2020 | Carpenter et al. |
| 2021/0155055 | A1 | 5/2021 | Nevin et al. |
| 2021/0181064 | A1* | 6/2021 | Kelly ................ B60C 11/24 |
| 2021/0347215 | A1 | 11/2021 | Haronian |

FOREIGN PATENT DOCUMENTS

| DE | 102021209133 A1 | 2/2023 |
| DE | 102022202095 B3 | 5/2023 |
| EP | 4116110 A1 | 1/2023 |

OTHER PUBLICATIONS

Search report for European application No. EP23213828 dated Apr. 10, 2024.

* cited by examiner

*Primary Examiner* — Michael V Kerrigan (74) *Attorney, Agent, or Firm* — Edward T. Kennedy (57) ABSTRACT

Information from sensors on first and second tires positioned adjacent to each other on a dual wheel hub is obtained and stored in a memory. Also, information about the operation of a vehicle is stored in the memory, where the first and second tires are located on the vehicle. A determination is made as to whether a tire radius difference exists between a first radius of the first tire and a second radius of the second tire based on the temperature values and other parameters. An indication is encoded for display that shows that a tire radius mismatch exists between the first and second tires.

14 Claims, 9 Drawing Sheets

DETECTION OF TIRE RADIUS MISMATCH

BACKGROUND

Tires on vehicles such as tractor/trailers used to haul freight and other items may be subject to significant wear over time. Given the significant amount of weight that tires can bear on a vehicle such as a tractor/trailer and given the speeds at which such vehicles travel, excessive wear of tires is possible, which can be undesirable, such as by being detrimental to the environment.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DEFINITIONS

"CAN bus" is an abbreviation for controller area network.

"Carcass" means the tire structure apart from the belt structure, tread, undertread, and sidewall rubber over the plies, but including the beads.

"Footprint" means the contact patch or area of contact created by the tire tread with a flat surface, such as the ground, as the tire rotates or rolls.

"Radial" and "radially" mean lines or directions that are perpendicular to the axis of rotation of the tire.

"TPMS" means a tire pressure monitoring system, which is an electronic system that measures the internal pressure of a tire and is capable of communicating the pressure to a processor that is mounted on the vehicle and/or is in electronic communication with electronic systems of the vehicle.

DETAILED DESCRIPTION

Various embodiments are set forth for determining whether a tire radius mismatch exists between two tires mounted on a dual wheel hub. In this respect, data is obtained from sensors in the tires that indicates the tire temperature, tire pressure, and potentially other parameters. Data may also be obtained from other systems in a vehicle from a CAN bus. According to various embodiments, a determination may be made from the data as to whether a tire radius mismatch exists between the tires mounted on the dual wheel hub. Such a tire radius mismatch can result in undue wear on the tires. Identification of such a tire radius mismatch allows for corrective action to be taken such as tire replacement or other action. In the description that follows, first various elements are introduced followed by a discussion of the operation of the same.

Figure 1:
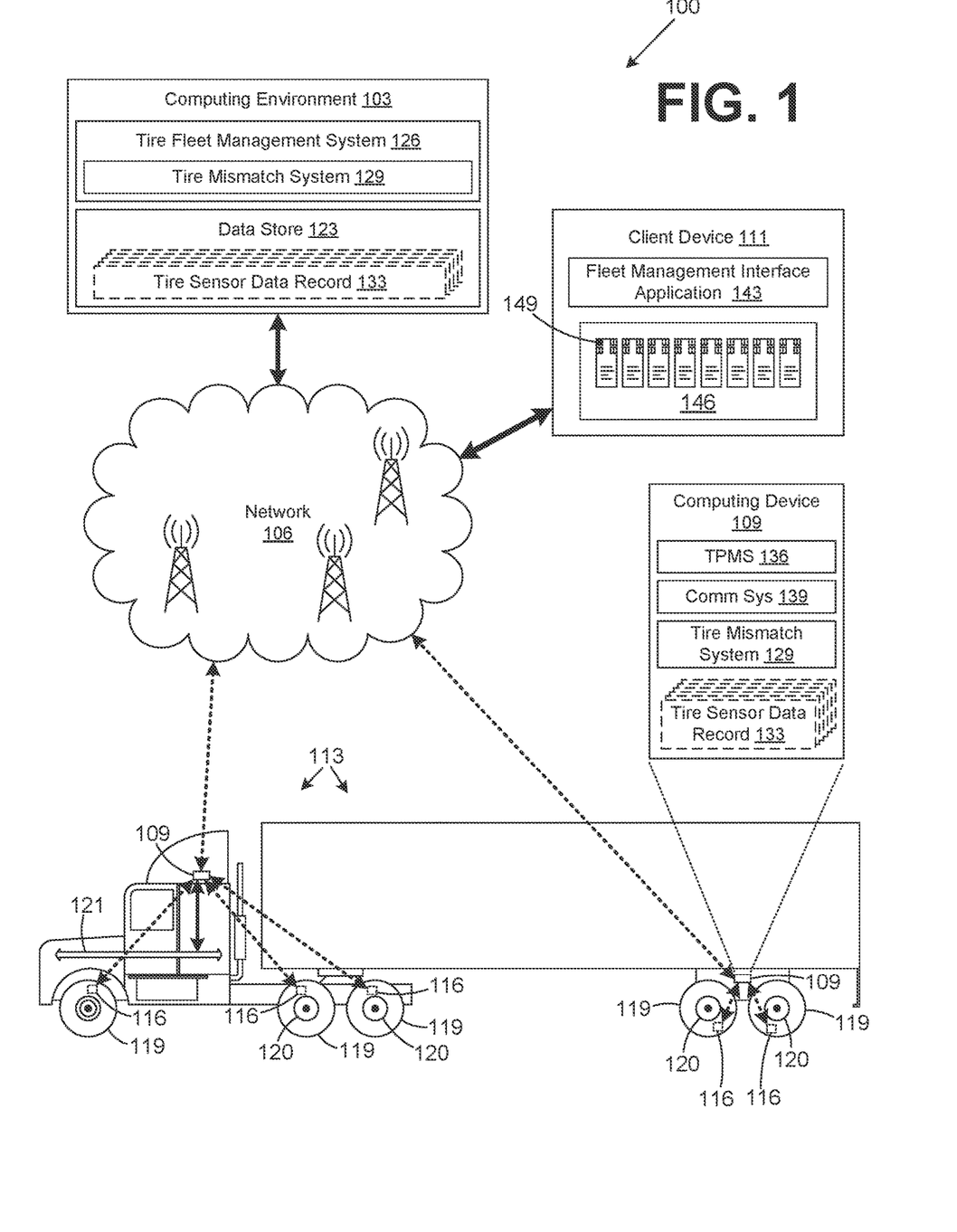
FIG. 1 is a drawing of a vehicle with one or more tires that include a tread wear sensor plug according to various embodiments of the present disclosure.

With reference to FIG. 1, shown is an example of a networked environment 100. The networked environment 100 includes a computing environment 103 and a network 106. The computing environment 103 is in data communication with computing devices 109 that are mounted, for example, on a vehicle 113 by way of the network 106. The networked environment 100 further includes a client device 111 that comprises a computing device as will be described.

The vehicle includes a plurality of sensors 116, each sensor 116 being positioned on the inside of a respective one of a plurality of tires 119 of the vehicle 113. The sensors 116 are employed as part of a tire pressure monitoring system (TPMS) as will be described. Some of the tires 119 are mounted on dual wheel hubs 120 such as in the case where the vehicle 113 comprises an eighteen-wheel tractor-trailer as depicted in FIG. 1. The vehicle 113 also includes, for example, a CAN bus 121 that facilitates data communication between various systems on the vehicle 113. In one embodiment, the computing device(s) are coupled to the CAN bus 121 and can communicate with systems included on the CAN bus 121.

Each of the major components of the networked environment 100 is described below followed by a discussion of the operation of the same.

The computing environment 103 may comprise, for example, a server computer or any other system providing computing capability. Alternatively, the computing environment 103 may employ a plurality of computing devices that may be arranged, for example, in one or more server banks or computer banks or other arrangements. Such computing devices may be located in a single installation or may be distributed among many different geographical locations. For example, the computing environment 103 may include a plurality of computing devices that together may comprise a hosted computing resource, a grid computing resource and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 123 that is accessible to the computing environment 103. The data store 123 may be representative of a plurality of data stores 123 as can be appreciated. The data stored in the data store 123, for example, is associated with the operation of the various applications and/or functional entities described below.

The components executed on the computing environment 103, for example, include a tire fleet management system 126, and other applications, services, processes, systems, engines, or functionality not discussed in detail herein. The tire fleet management system 126 is employed to track the location and status of fleet of tires 119 mounted on a plurality of vehicles 113. Such a tire fleet management system 126 may track hundreds if not thousands of tires 119 on many vehicles 113. The tire fleet management system 126 indicates to operators when tires 119 may need to be serviced, replaced, or the tire fleet management system 126 may provide other information.

In one embodiment, the various components of the tire fleet management system 126 comprise a tire mismatch system 129. The tire mismatch system 129 is executed to detect whether a tire diameter mismatch exists between two tires that are mounted adjacent to each other on a dual wheel hub 120 as will be described in further detail below.

In addition, stored in the data store 123 is data in the form of tire sensor data records 133. The tire sensor data records 133 may also be stored in a memory of the computer device 109. Each of the tire sensor data records 133 includes an instance of a given reading of sensor data from a respective one of the tires 119 and potentially information from a CAN bus 121 on the vehicle 113 at a given time as will be described. The information from the CAN bus 121 on the vehicle 113 may comprise, for example, times when the brakes of the vehicle 113 have been engaged, torque generated by the engine and applied to wheels/tires, state of the steering wheel or whether the vehicle 113 is turning or is being driven straight, and many other information about the operation of the vehicle 113. The information from the CAN bus 121 may be communicated to the tire fleet management system 126 for use in evaluating the status of the tires 119 in the fleet. As an additional alternative, the computing devices 109 may obtain information from the CAN bus 121 and include such information in the tire sensor data records 133.

The network 106 may comprise, for example, the Internet, intranets, extranets, wide area networks (WANs), local area networks (LANs), wired networks, wireless networks, cellular networks, satellite networks, cable networks, Wifi networks, or other suitable networks, etc., or any combination of two or more such networks.

The computing device 109 comprises a processor circuit that executes, for example, a tire pressure monitoring system (TPMS) 136. In one embodiment, the computing device 109 may be integrated with other systems in the vehicle 113. In the case that the vehicle comprises a tractor-trailer, the computing device 109 may be located on the back of the trailer so as to be within range of wireless communication with the sensors 116 in the tires 119 of the trailer. The computing device 109 also includes a communication system 139 to facilitate communication with the tire fleet management system 126 over the network. In this respect, the computing device 109 may include appropriate communications capabilities to link to a cellular network, Wifi network, or other network communications capabilities.

In one embodiment, the TPMS 136 communicates with the sensors 116 periodically to obtain information from the sensors 116, where such information includes a sensor identifier, pressure values, temperature values, and potentially other information from the sensors 116. Such information is stored, for example, as tire sensor data records 133 in a memory associated with the computing device 109. In one embodiment, each tire sensor data record 133 includes information obtained from a single readout of a given sensor 116. In addition, the TPMS 136 includes a timestamp in each tire sensor data record 133 to indicate when the pressure and temperature values were read from a respective sensor 116. Alternatively, the sensors 116 may generate a timestamp at the time it provides the sensor data to the TPMS 136.

In one embodiment, tire mismatch system 129 may be implemented locally on the computing device 109 where the detection of whether a tire diameter mismatch exists between two tires that are mounted adjacent to each other on a dual wheel hub 120 is performed local to the vehicle 113.

The client device 111 may be configured to execute various applications such as a fleet management interface application 143. The fleet management interface application 143 may be executed in the client device 111, for example, to access network content served up by the tire fleet management system 126 and/or other servers, thereby rendering a user interface 146 on a display device. In one embodiment, the tire fleet management system 126 includes a web server, although other server technologies may be employed. To this end, the fleet management interface application 143 may comprise, for example, a browser or a dedicated application, and the user interface 146 may comprise a network page such as a web page or an application screen. The client device 111 may be configured to execute applications beyond the fleet management interface application 143 such as, for example, email applications, word processors, spreadsheets, and/or other applications.

The fleet management interface application 143 facilitates interaction with the tire fleet management system 126. In one embodiment, the tire fleet management system 126 encodes the user interface 146 that is sent to the fleet management interface application 143 and is rendered on a display device as can be appreciated. In one embodiment, the user interface 146 includes an indication 149 that a tire radius mismatch exists between the first and second tires 119 when the tire radius difference of the first and second tires is detected as will be described.

The operation of the various elements of the networked environment 100 are described with reference to the figures that follow.

Figure 2:
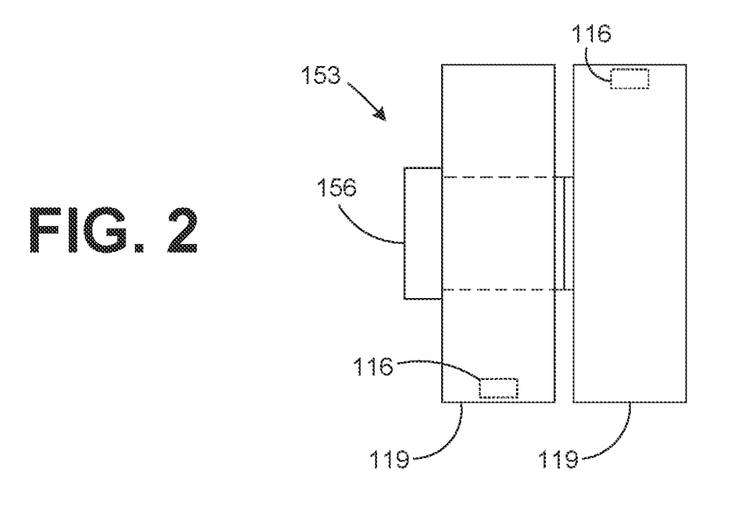
FIG. 2 is a view of a pair of tires shown in FIG. 1 mounted on a dual wheel hub according to various embodiments of the present disclosure.

Referring next to FIG. 2, shown is an example of a dual wheel hub assembly 153 that includes a first and second tire 119 mounted on a dual wheel hub 120. As such, the first and second tires 119 are positioned adjacent to each other. Each tire includes a sensor 116 that can provide measurements of pressure, temperature, and other characteristics of the tire as part of a TPMS system as can be appreciated. Also, the dual wheel hub assembly 153 includes a brake 156 as can be appreciated.

Figure 3:
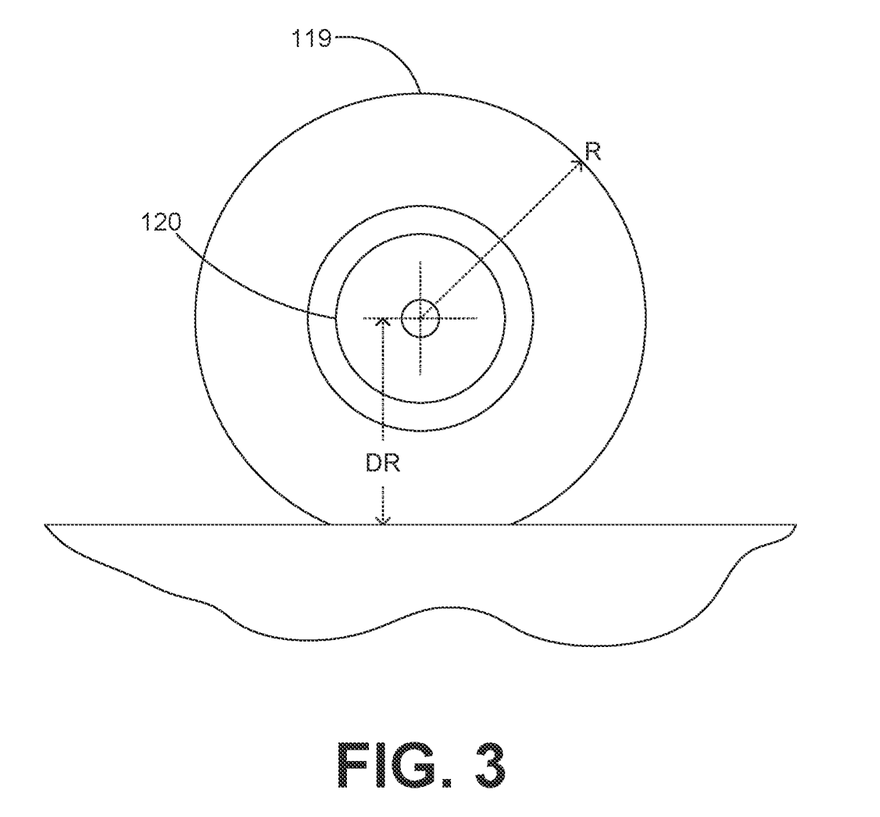
FIG. 3 is a side view of a tire shown in FIG. 1 according to various embodiments of the present disclosure.

With reference to FIG. 3, shown is side view of a tire 119 as mounted on a dual wheel hub 120. Given that the footprint of the tire 119 is the contact patch or area of contact by the tire 119 with a flat surface such as the ground, a portion of the tire 119 is deflected. A radius of the tire at the shortest distance from the axis of rotation of the tire 119 and the point of greatest deflection of the footprint is a deflected radius DR of the tire. A radius R of the tire 119 is specified as the distance from the axis of rotation to an outer edge of the tire 119 outside of the footprint. The radius R can differ from one tire 119 to the next tire 119 due to tread wear. That is to say, a tire 119 that has a greater amount of tread wear will have a smaller radius R than a newer tire 119 with little or no wear.

Figure 4A:
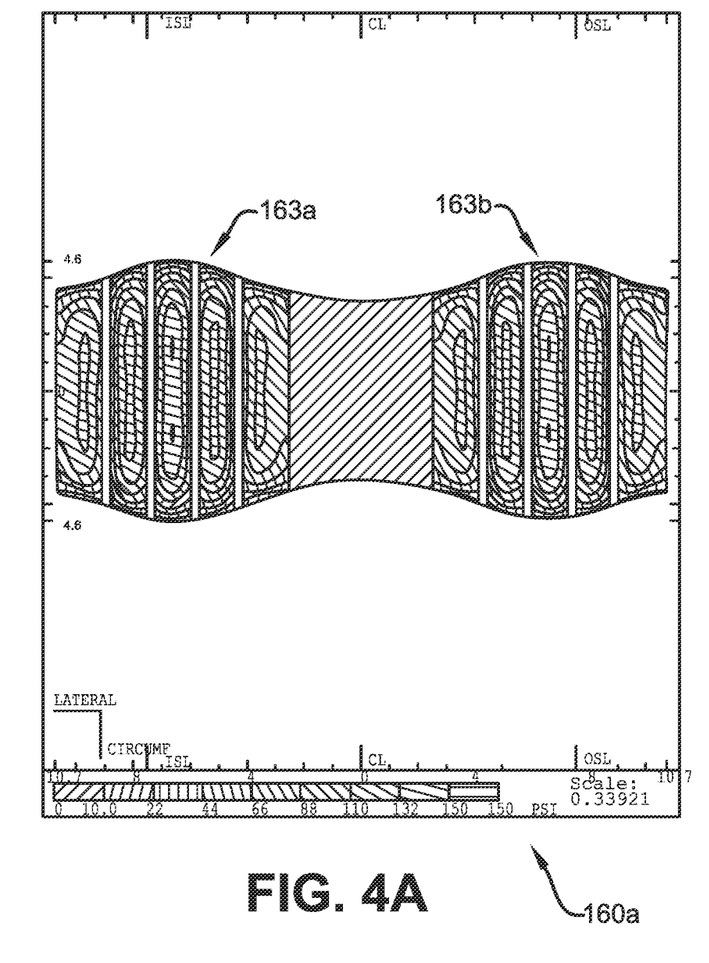
FIGS. 4A and 4B show a result of a finite element analysis of tires on a dual wheel hub as depicted in FIG. 2 according to various embodiments of the present disclosure.
Figure 4B:
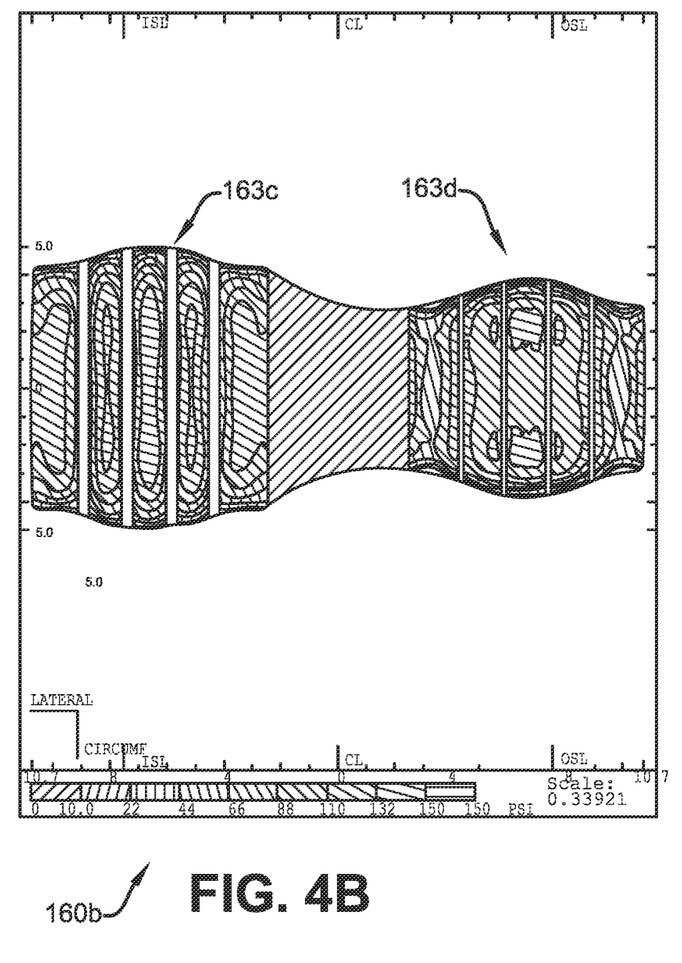

Referring next to FIGS. 4A and 4B, shown are finite element analysis renderings 160*a*, 160*b* of theoretical thermal footprints 163*a-d* of two different pairs of tires 119 (FIG. 1) that would be mounted on a dual wheel hub 120 (FIG. 2). Each of the thermal footprints 163*a-d* show a temperature distribution of the portion of a tire 119 that forms a footprint of a given tire 119. When the tires 119 are placed under a load, the deflected radius DR will be the same for both tires 119 regardless of the radius R of each tire 119 as equilibrium is reached between the load, tires 119, and other elements. For both of finite element analysis renderings 160*a/b*, the load on the pair of tires 119 is 11,350 foot-pounds (5675 foot-pounds×2) at 100 PSI moving at 50 mph.

Referring first to FIG. 4A, the theoretical thermal footprints 163*a* and 163*b* are depicted for tires 119 that are both new, where each of the tires 119 in the pair has the same radius R.

As shown in the theoretical thermal footprint 163*a*, the deflected radius DR is 474.8 mm for both of the tires 119 that theoretically exist on a given dual wheel hub 120. As shown, the temperature distribution of each of the thermal footprints 163*a* and 163*b* are similar given the fact that the tires 119 have the same radius R.

With reference to FIG. 4B, the theoretical thermal footprints 163*c* and 163*d* are depicted for tires 119 that are mismatched in that the respective radius R of each of the tires 119 is different. In particular, the tire 119 corresponding to the thermal footprint 163*c* is new with a maximum radius R and the tire 119 corresponding to the thermal footprint 163*d* is worn such that the tread depth is 6/32 inches (4.76 mm). A new tire would have a tread depth that may be, for example, 18/32 inches. As shown, the thermal footprint 163*c* is much larger than the thermal footprint 163*d* due to the fact that the tire 119 corresponding to the thermal footprint 163*c* has a larger radius R than the tire 119 corresponding to the thermal footprint 163*d*. Also, as shown, the tire 119 corresponding to the thermal footprint 163*c* has more areas that reach higher temperatures. This is likely due to the fact that the thermal footprint 163*c* is larger and that the corresponding tire 119 bears more weight than the tire 119 corresponding to the thermal footprint 163*d*. This fact likely results in a higher rate of wear of such tire 119, thereby resulting in a shorter useful life of the tire 119 until the tread has worn to maximum recommended limits.

In addition, the wear pattern associated with the thermal footprint 163*d* is much different, resulting in further wear of the tread of the corresponding tire 119 that may be uneven. Given that the radius R of the respective tires 119 are different for the thermal footprints 163*c/d*, then the wear of the respective tires 119 differs relative to the tires 119 corresponding to the thermal footprints 163*a/b* of FIG. 4A.

Figure 5A:
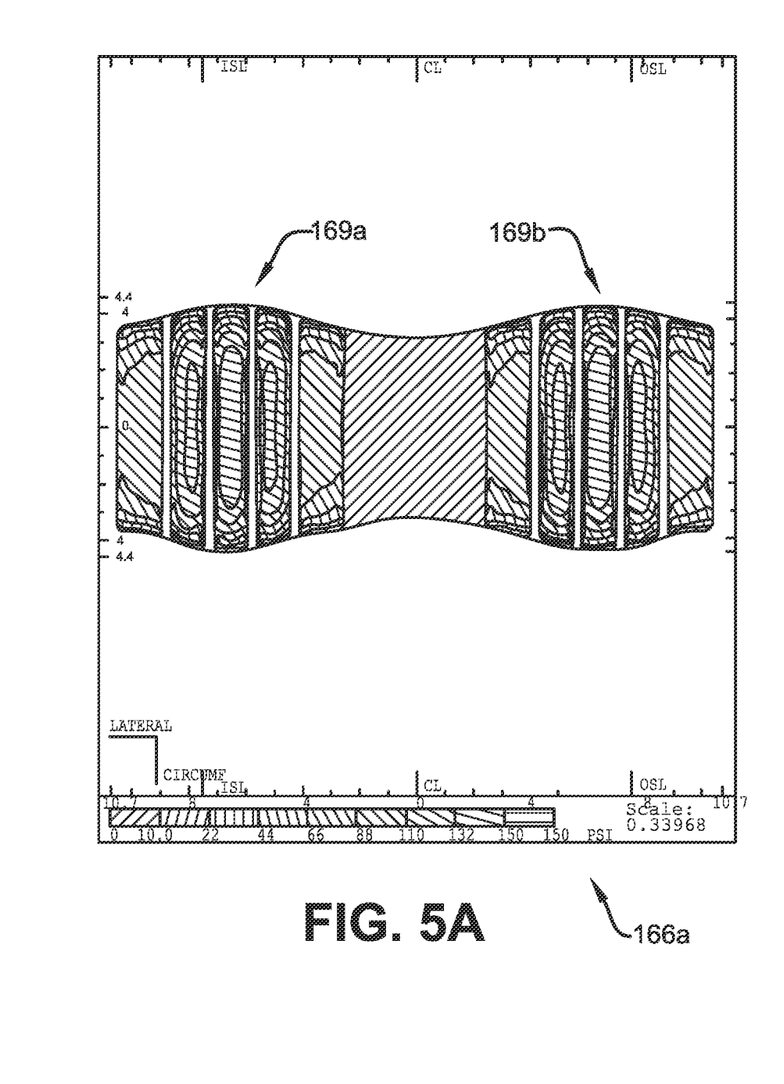
FIGS. 5A and 5B show a result of a finite element analysis of tires on a dual wheel hub as depicted in FIG. 2 according to various embodiments of the present disclosure.
Figure 5B:
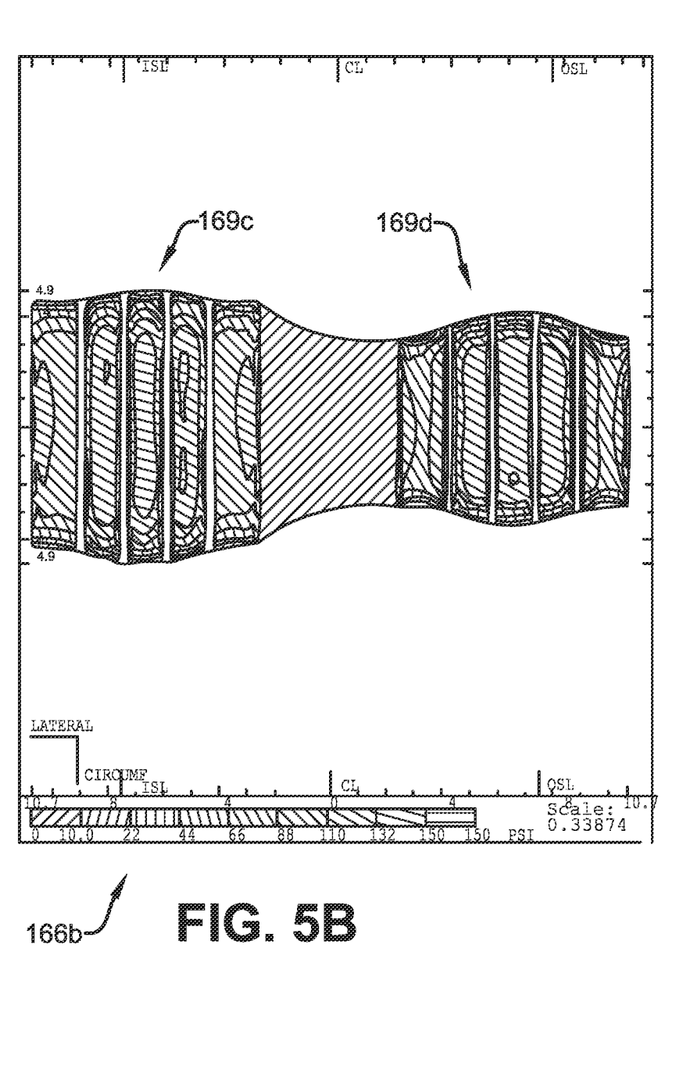

With reference to FIGS. 5A and 5B, shown are finite element analysis renderings 166*a*, 166*b* of theoretical thermal footprints 169*a-d* of two different pairs of tires 119 (FIG. 1) that would be mounted on a dual wheel hub 120 (FIG. 2). Each of the thermal footprints 169*a-d* show a temperature distribution of the portion of a tire 119 that forms a footprint of a given tire 119 as depicted in FIGS. 4A and 4B. When the tires 119 are placed under a load, the deflected radius DR will be the same for both tires 119 regardless of the radius R of each tire 119 as equilibrium is reached between the load, tires 119, and other elements. For both of finite element analysis renderings 166*a/b*, the load on the pair of tires 119 is 11,350 foot-pounds (5675 foot-pounds×2) at 100 PSI moving at 50 mph. The deflected radius DR for the thermal footprints 169*a/b* is 475.66 mm. The deflected radius DR for the thermal footprints 169*c/d* is 470.63 mm.

With reference to FIGS. 4A, 4B, 5A, and 5B, the finite element analysis renderings 160*a/b* and 166*a/b* show that in situations where there is a mismatch in the radius R of two tires 119 installed on a dual wheel hub 120, more heat is generated in the tire 119 having the greatest radius R of the two tires 119.

Figure 6:
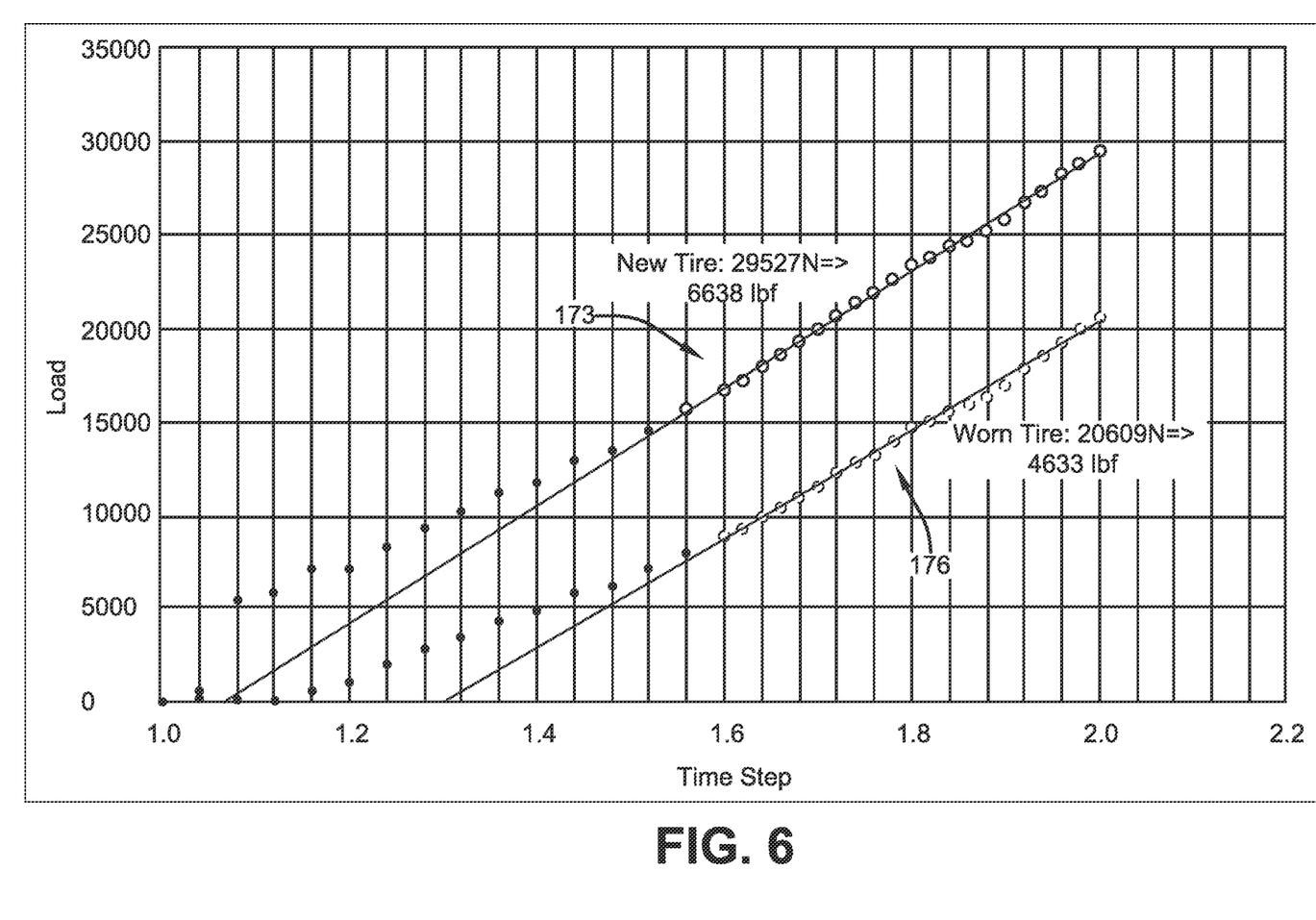
FIG. 6 shows a graph that depicts an indication of temperature in the tires of FIG. 2 relative to time according to various embodiments of the present disclosure.

Referring next to FIG. 6, shown are curves that depict the loads that are born by the individual tires 119 (FIG. 1) on a dual wheel hub 120 (FIG. 2).

Figure 7:
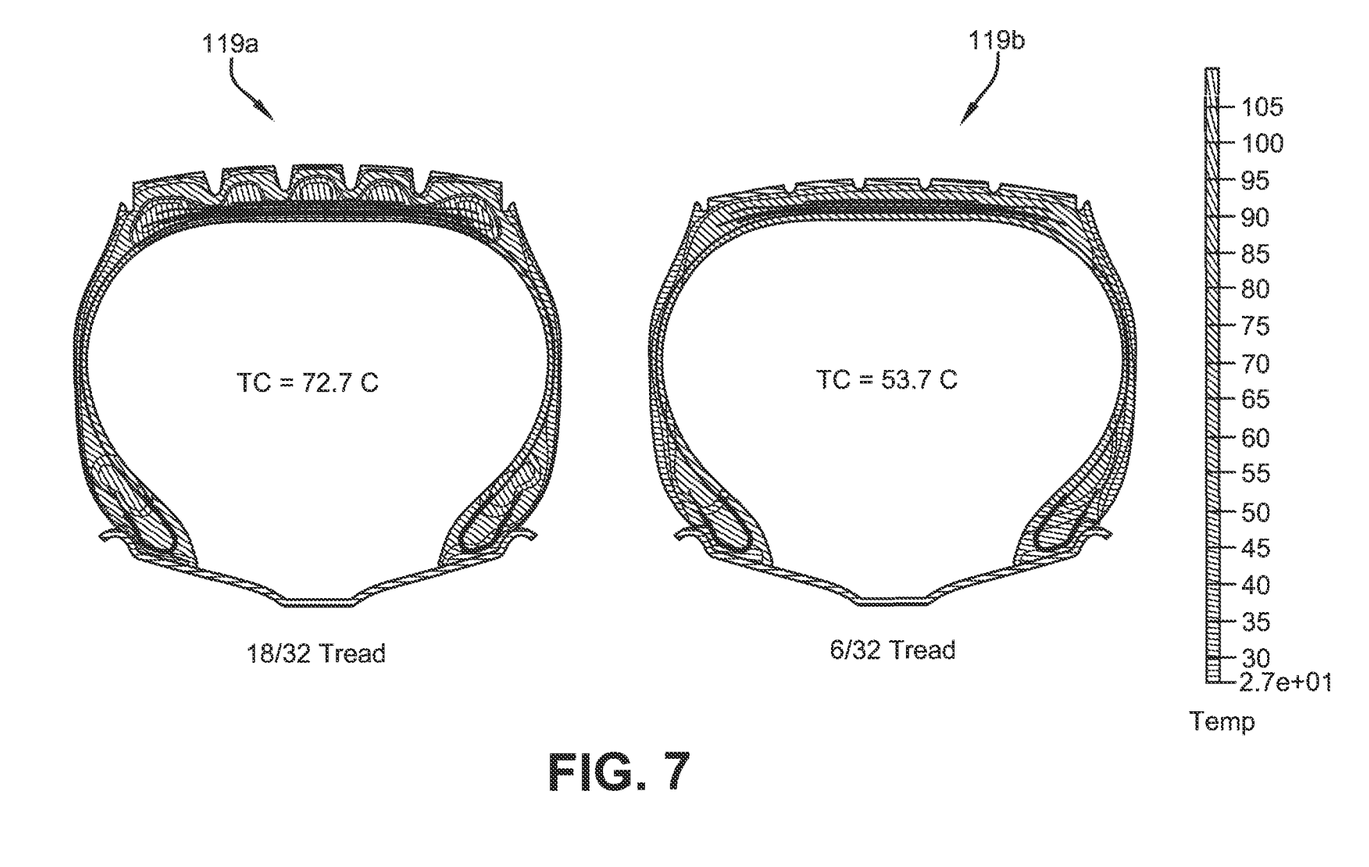
FIG. 7 shows a cross-sectional view of a pair of tires as depicted in FIG. 2 that indicates a heat distribution of the tires according to various embodiments of the present disclosure.

With reference to FIG. 7, shown are temperature profiles of two tires 119, denoted herein as tires 119*a* and 119*b*, generated using finite element analysis. The tire 119*a* has a tread depth of 18/32 inches and the tire 119*b* has a tread depth of 6/32 inches. Thus, the tire 119*a* has a radius R that is greater than the radius R of the tire 119*b*. Also, the tire 119*a* bears approximately 6638 foot-pounds at 100 PSI and the tire 119*b* bears approximately 4633 foot-pounds at 100 PSI. Given its greater size and the fact that it bears a greater amount of weight, the material of the tire 119*a* runs at higher temperatures. Specifically, the areas where belts and other such structures are included in the tire 119*a* are subject to greater frictional forces and experience higher temperatures than do the counterpart structures in the tire 119*b*. As a consequence, the resulting temperature of the cavity of the tire 119*a* is 72.7 degrees Celsius and the temperature of the cavity of the tire 119*b* is 53.7 degrees Celsius. This is a further illustration of the fact that a first tire 119 mounted on a dual wheel hub 120 (FIG. 2) having a greater radius R than a second tire 119 mounted on the same dual wheel hub 120 will be heated to higher temperatures than the second tire 119 having a lesser radius R.

Referring back to FIG. 1, the operation of the various elements of the networked environment 100 is discussed. As the vehicle 113 is driven, the sensors 116 generate readings of temperature, pressure, and potentially other parameters associated with a respective one of the tires 119. The TPMS 136 executed in a computing device 109 communicates with the sensors 116 to obtain the pressure, temperature, and other readings from the respective sensors 116. In one embodiment, the sensors 116 generate the full tire sensor data record 133 including sensor identifier information, a timestamp, pressure, temperature, and potentially other parameters. The sensors 116 transmit the same to the TPMS 136 executed by the computing device 109. Alternatively, the sensors 116 may transmit sensor identifier information, pressure information, temperature information, and potentially other parameters to the TPMS 136 in the computing device 109, and the computing device 109 may package such information in the form of a tire sensor data record 133 with a timestamp.

In one embodiment, the tire sensor data records 133 are temporarily stored in the computing device 109. The communication system 139 periodically transmits the tire sensor data records 133 to the tire fleet management system 126 where they are stored in the data store 123. Alternatively, in cases where the tire mismatch system 129 is executed in the computing device 109, the tire sensor data records 133 may remain in a memory of the computing device 109 for purposes of analysis by the tire mismatch system 129. In such a case, a copy of the tire sensor data records 133 may still be transmitted to the tire fleet management system 126.

The tire fleet management system 126 is executed in the computing environment 103 to track the status of tires 119 on multiple vehicles 113. In one embodiment, the tire mismatch system 129 is executed as part of the tire fleet management system 126 to detect when there is a tire radius difference between first and second tires 119 positioned adjacent to each other on a dual wheel hub 120. Such a tire radius difference is identified so that corrective action may be taken to prevent accelerated wear of the tread of the tires 119 by tire replacement or other action.

In one embodiment, the status of tires 119 is maintained on the tire fleet management system 126. From time to time, the fleet management interface application 143 may request a user interface 146 to review the status of the tires 119 in the fleet, where the user interface 146 indicates when a tire radius mismatch is detected. To this end, the tire fleet management system 126 encodes for display an indication that a tire radius mismatch exists between the first and second tires 119 on a given dual wheel hub 120 of a respective vehicle 113 when it has been detected that the tire radius difference exists. The indication may be encoded, for example, as part of a network page such as a web page or some other graphical user interface. The network page or other interface that embodies the indication is transmitted to the client device 111 and rendered on a display device as the user interface 149.

The indication may be any interface mechanism that shows that the tire radius mismatch exists between the respective two tires 119 for a given vehicle 113. For example, mismatched tires 119 may be represented by user interface components that involve blinking, highlighting with a predefined color, or other indication.

In order to determine whether a tire radius difference exists between first and second tires 119 mounted on a dual wheel hub 120, the tire mismatch system 129 accesses temperature values or other values from the tire sensor data records 133. In one embodiment, the existence of a tire radius difference is determined based on the temperature values from the tire sensor data records 133 from the respective first and second tires 119 on the dual wheel hub 120. The temperature values from the respective tires 119 may be used themselves or, alternatively, an average temperature value may be calculated for each tire 119 on the dual wheel hub 120 from multiple temperature values taken over time, over a given segment of travel, or on some other basis.

In order to determine whether the tire radius difference exists based on the temperature values from each tire 119 on a dual wheel hub 120, a temperature difference threshold may be specified. This reflects the fact that when a sufficient tire radius difference exists between first and second tires, a temperature differential is created between the two tires 119 given that the tire 119 having the greater radius R is subject to greater frictional forces than the tire 119 having the lesser radius R on the dual wheel hub 120 as described above.

According to one embodiment, a tire radius difference is detected when a difference in the temperature values from the respective tires 119 on a dual wheel hub 120 is greater than or equal to the predefined temperature difference threshold. Such temperature values may be individual temperature values or averaged temperature values over time.

In addition, care is taken to ensure that the temperature values from the tire sensor data records 133 are not unduly influenced by factors external to a free rotation or a driven rotation of the first and second tires 119 on a dual wheel hub 120. A free rotation refers to tires 119 on a dual wheel hub 120 that is located, for example, on a trailer of a tractor/ trailer where such tires 119 rotate freely with the movement of the trailer. A driven rotation refers to tires 119 on a dual wheel hub 120 that is located on a tractor of a tractor/trailer that are subject to torque from the motor and transmission of the tractor/trailer. As such, the tires 119 that rotate freely are potentially subject to less friction than tires 119 that are driven by the engine of the vehicle 113.

Factors external to a free rotation or a driven rotation of the tires 119 may be, for example, an application of the brakes of the vehicle 113. As shown with reference to FIG. 2, a brake 156 is typically located adjacent to the dual wheel hub 120. When the brake 156 is engaged, heat is generated that may be conducted through the dual wheel hub 120 to the tires 119. Given that the brake 156 is typically closer to an interior mounted tire 119, the interior mounted tire 119 on a dual wheel hub 120 may experience higher temperatures than the exterior mounted tire 119. Alternatively, an item such as a mud flap may be positioned incorrectly resulting in unwanted friction between the item and one or both of the tires 119 mounted on the dual wheel hub 120, thereby generating heat. Still further, bearings associated with the dual wheel hub 120 may be faulty resulting in friction and the generation of heat. There may be other factors that would influence the temperatures sensed in the tires 119 of a dual wheel hub 120.

According to one embodiment, the tire mismatch system 129 identifies temperature values from the tires in which an amount of heat generated due to factors external to a free rotation or a driven rotation of the first and second tires 119 on a dual wheel hub 120 is minimized. This may be done, for example, by identifying a segment of travel for the tires 119 in which an amount of heat generated by such external factors are eliminated or minimized, where the temperature values were generated while the first and second tires 119 were in transit in the segment of travel. Such a segment of travel may be, for example, a segment of travel of the vehicle 113 in which the brakes were never employed and the vehicle 113 traveled at a relatively constant velocity with little acceleration or deceleration such as might occur on a relatively level and straight portion of highway.

A tire radius difference between the respective tires 119 on a dual wheel hub 120 may be detected or determined to exist if a difference between the temperature values of the respective tires 119 at a given time on a dual wheel hub 120 are greater than or equal to a predefined temperature difference threshold.

Alternatively, a first average of temperature value may be calculated from temperature values from a first tire 119 on a dual wheel hub 120 taken during the travel segment, and a second average of temperature values may be calculated from temperature values from a second tire 119 on the dual wheel hub 120 taken during the same travel segment. A tire radius difference between the respective tires 119 on a dual wheel hub 120 may be detected or determined to exist if a difference between first and second average of temperature values are greater than or equal to a predefined temperature difference threshold.

As an additional alternative, the temperature values from the first and second tires 119 on dual wheel hub 120 may be processed to minimize or remove the effect of factors external to a free rotation or a driven rotation of the first and second tires. In so processing, for example, temperature values that are temporarily elevated due to an application of the brakes or other external factor may be lowered accordingly based on temperature values that are not subject to the influence of the brakes or other short-term source of friction and heat. The determination of whether a tire radius difference exists may be made using the processed temperature values from the first and second tires 119 on the dual wheel hub 120. In particular, a difference in the processed temperature values from the first and second tires 119 may be compared with the predefined temperature difference threshold as described above. Alternatively, first and second average temperature values may be calculated from the processed temperature values taken from the respective tires 119. A difference between the first and second average temperature values may be compared with the predefined temperature difference threshold as described above.

In another embodiment the predefined temperature difference threshold is determined relative to baseline temperature values determined for first and second tires 119 on a dual wheel hub 120. That is to say, in determining a difference between the temperature values from first and second tires 119 on a dual wheel hub 120, the baseline temperature values may be taken into account. For example, the predefined temperature difference threshold may be determined relative to a baseline temperature differential calculated from the respective baseline temperature values for each of the tires 119. This reflects that there may be process variation from one tire 119 to the next, which may result in variation between respective baseline temperature values. Also, the position of the respective tires on a given vehicle 113 may result in variation of baseline temperature values of tires 119 where some may be more exposed to air movement and other factors.

To generate baseline temperature values, in one embodiment, the tire mismatch system 129 identifies a time period in which a difference between a first radius of a first tire and a second radius of a second tire is known to be less than a maximum allowable radius difference threshold. That is to say, a time period is identified in which the respective tires 119 on a dual wheel hub 120 are known to be roughly the same size or where a difference between the tire radii R for the respective tires 119 is within the maximum allowable radius difference threshold with respect to each other. In one embodiment, the maximum allowable radius difference threshold is specified as ¼ inch, although other differences may be specified.

In order to determine a time period where a difference in the tire radii R of the tires 119 on a dual wheel hub 120 is within the maximum allowable radius difference threshold, records may be consulted that indicate when two new tires 119 having the same tire radius R have been installed on a given dual wheel hub 120. In this respect, one may employ the client device 111 to input a time when such tires 119 were installed on a given vehicle 113 by way of an appropriate user interface 146. Alternatively, the tires 119 on a dual wheel hub 120 may be measured from time to time and the tire radius R for each tire 119 may be input into the tire mismatch system 129 by way of a user interface 149, where a time of the measurement may be provided when such inputs are made. When the tire radius R of each tire 119 is input, the tire mismatch system 129 can determine whether the difference in the tire radii R of the tires 119 on a dual wheel hub 120 is within the maximum allowable radius difference threshold.

Once a time period is identified where the difference in the tire radii R of the tires 119 on a dual wheel hub 120 is known to be within the maximum allowable radius difference threshold, then a segment of travel of the tires is identified that occurs within the time period, where the amount of heat generated in the respective tires 119 mounted on the dual wheel hub 120 due to a factor external to a free rotation or a driven rotation of the first and second tires 119 is substantially minimized. A first baseline temperature value for a first one of the tires 119 is determined based on a plurality of first temperature values taken from the first tire 119 during the segment of travel. Also, a second baseline temperature value for a second one of the tires 119 is determined based on a plurality of second temperature values taken from the second tire 119 during the segment of travel.

Figure 8:
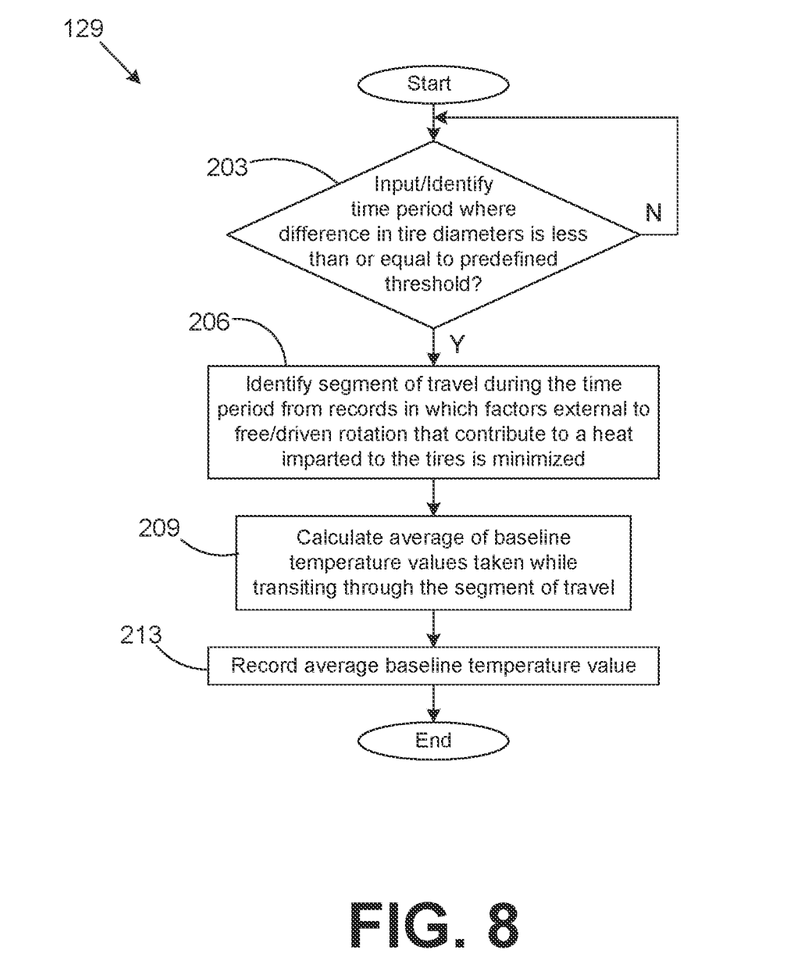
FIG. 8 is a flowchart that depicts a portion of the functionality of a tire mismatch system of FIG. 1 according to various embodiments of the present disclosure.

Referring next to FIG. 8, shown is a flowchart that provides one example of the operation of a portion of the tire mismatch system 129 according to various embodiments. It is understood that the flowchart of FIG. 8 provides merely an example of the many different types of functional arrangements that may be employed to implement the operation of the portion of the tire mismatch system 129 as described herein. As an alternative, the flowchart of FIG. 8 may be viewed as depicting an example of elements of a method implemented in the computing environment 103 (FIG. 1) or the computing device 109 (FIG. 1) according to one or more embodiments.

Beginning with box 203, the tire mismatch system 129 identifies a time period where a difference between the tire radii R of the two tires 119 (FIG. 1) on a dual wheel hub 120 (FIG. 1) is known to be within the maximum allowable radius difference threshold. This may be determined by identifying times stored in the data store, for example, where it is known that the tire radii R of the two tires is known to be within the maximum allowable radius difference threshold. Such times may be input into the tire mismatch system 129 when such tires 119 are initially installed or measured from time to time by way of appropriate user interfaces 146 (FIG. 1) as was discussed above.

The time period is a length of time in which it is assumed that the tire radius R of each tire 119 mounted on a dual wheel hub 120 will not significantly change such that it can be assumed that any difference that arises between the tire radii R of the two tires 119 will remain within the maximum allowable radius difference threshold. Alternatively, rather than a time period, a distance of travel may be specified of the tires 119 after the time where it is known that the radii R of the two tires 119 will remain within the maximum allowable radius difference threshold.

Thereafter, in box 206, a segment of travel is identified during the time period or distance of travel identified in box 203 above from the tire sensor data records 133 (FIG. 1) in which heat generated due to factors external to the free rotation or driven rotation of the tires 119 is minimized. This ensures that any temperature differential that exists between the respective tires 119 mounted on a dual wheel hub 120 is not due to such external factors. The external factors may include an application of the brakes of the vehicle, friction due to mud flaps, friction due to faulty bearings, or other external factors. As such, the tire sensor data records 133 and/or other data may be consulted to identify segments of travel where such external factors are minimized or do not occur. For example, a given segment of travel might be identified where the brakes of the vehicle were not engaged.

Next, in box 209 an average baseline temperature value is calculated for each of the tires 119 mounted on a dual wheel hub 120 from the temperature values in the tire sensor data records 133 taken for the tires 119 while in transit through the segment of travel.

In box 213, the average baseline temperature values are stored in the data store 123 (FIG. 1) in association with the respective tires 119 to be consulted to detect when a tire radius difference exists such that corrective action should be taken. Thereafter, this portion of the tire mismatch system 129 ends as shown.

Figure 9A:
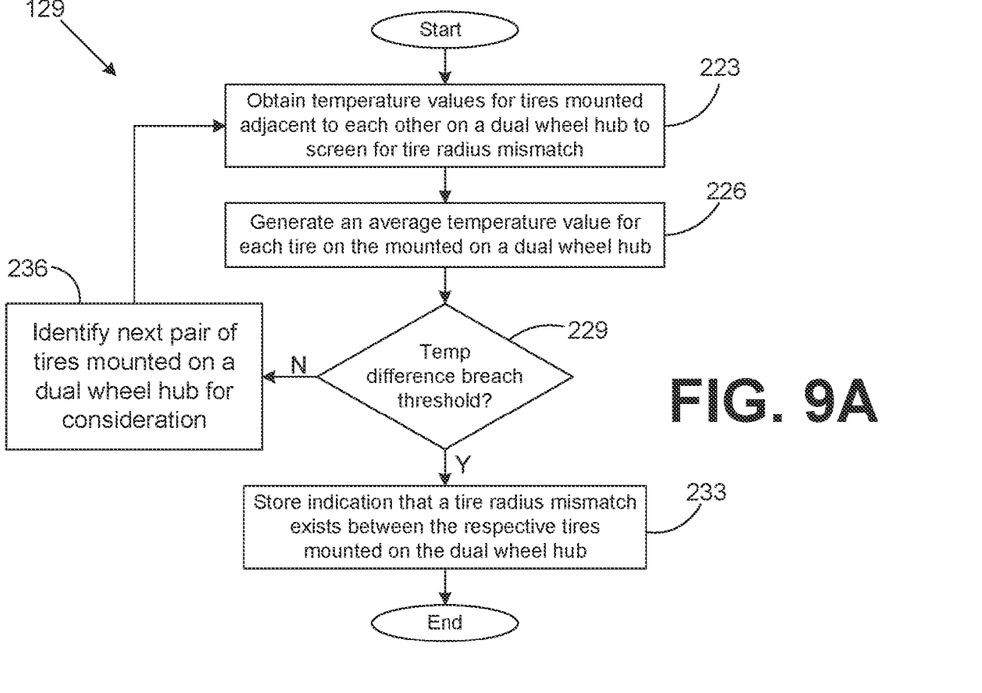
FIGS. 9A and 9B depict flowcharts of further portions of the functionality of the tire mismatch system of FIG. 1 according to various embodiments of the present disclosure.
Figure 9B:
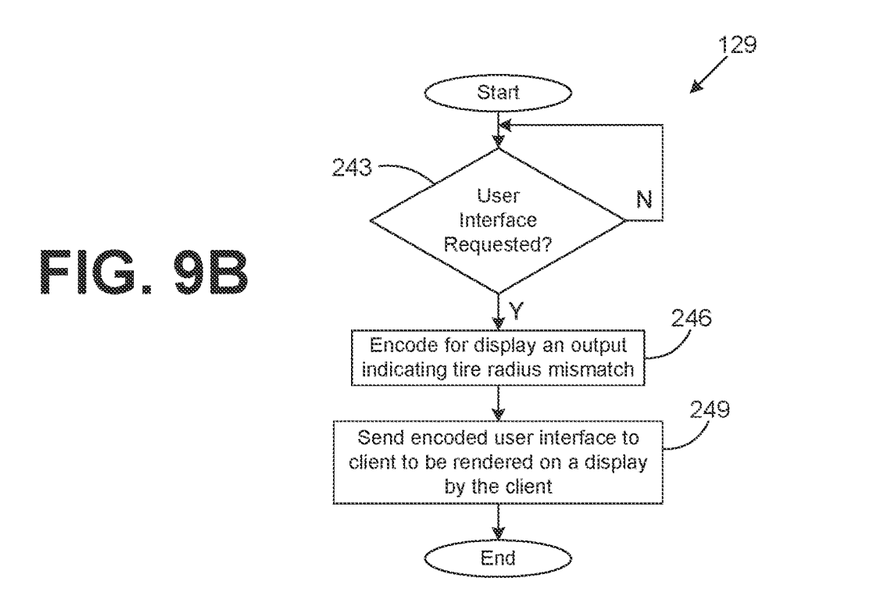

Referring next to FIGS. 9A and 9B, shown are flowcharts that provide examples of the functionality of various portions of the tire mismatch system 129 according to various embodiments. It is understood that the flowcharts of FIGS. 9A and 9B provide merely examples of the many different types of functional components that may be employed to implement the operation of the tire mismatch system 129 as described herein. As an alternative, the flowcharts of FIGS. 9A and 9B may be viewed as depicting examples of elements of methods implemented in the computing environment 103 (FIG. 1) or the computing device 109 (FIG. 1) according to one or more embodiments.

Beginning with box 223, the tire mismatch system 129 obtains temperature values for first and second tires 119 (FIG. 1) mounted adjacent to each other on a dual wheel hub 120 (FIG. 1) to screen the respective tires 119 for a tire radius mismatch. To obtain the temperature values for the respective tires 119, the tire sensor data records 133 (FIG. 1) are accessed.

In order to ensure that the temperature values for the tires 119 accurately reflect the temperature of the respective tires 119 during a free rotation or a driven rotation of the tires 119, the tire mismatch system 129 may use one of several approaches. That is to say that in order to determine a tire radius mismatch between the tires 119, the temperature values that reflect heat generated during a free rotation of the tires 119 or a driven rotation of the tires 119 are determined or identified. This is done to avoid temperature values from the tires 119 that may be skewed by heat generated by factors external to a free rotation or driven rotation of the tires 119 as described above.

In one approach, a segment of travel is identified in which heat generated by factors external to the free rotation or driven rotation of the tires 119 is minimized. Such a segment of travel may comprise, for example, travel along a level and straight stretch of highway where the velocity of the vehicle 113 (FIG. 1) is relatively constant with minimal use of brakes as determined from data obtained from the CAN bus 121 (FIG. 1). Such a segment of travel might be one where cruise control is engaged for a period of time. If there is significant heat generated in one of the tires 119 during such a segment of travel as evidenced by the temperature values of one tire 119 relative to the other tire 119, then it is more likely due to a tire radius mismatch.

Alternatively, the temperature values from the first and second tires 119 maybe processed or normalized by minimizing or eliminating the effect on temperature in the tires 119 due to factors external to the free rotation or driven rotation of the tires 119. For example, in some short segments of travel, the brakes may be engaged thereby generating heat in the dual wheel hub 120 and imparting an increase in temperature to the tires 119, where the tire 119 that is closest to the brake is likely to experience a greater increase in temperature than a tire 119 located farthest from the brake. The temperature values taken during such short segment of travel in which the brakes were engaged may be adjusted to eliminate any increase in temperature due to heat generated by the brakes. To this end, the temperature values from the tires 119 taken over time can be examined to determine the effect of the brakes on the temperature values and the temperature values may be adjusted accordingly.

In this manner, the temperature values may be adjusted or otherwise processed to eliminate or minimize the effect on temperature created by factors external to the free rotation or driven rotation of the tires 119 on a dual wheel hub 120. Stated another way, the temperature values may be normalized so as to represent the temperature of the tires 119 without undue influence of such external factors so that the temperature values can be used as a reliable indicator of whether a tire radius mismatch exists due to a temperature differential between the tires 119. In such case, the temperature differential would be likely due to a tire radius mismatch and not due to external factors as described herein.

Assuming that the tire mismatch system 129 has obtained temperature values in which the influence from factors external to a free rotation or driven rotation of the tires 119 is minimized or eliminated from a segment of travel or from processing as noted above, the process proceeds to box 226 to generate average temperature values for each tire 119 on the dual wheel hub 120. Note that the function in box 226 may be optional where select temperature values may also be used directly without averaging.

Then, in box 229 it is determined whether a temperature difference that may exist between the respective tires 119 mounted on a dual wheel hub 120 is greater or equal to a predefined temperature difference threshold. If a temperature difference between the temperature values of the respective tires 119 is greater than or equal to the predefined temperature difference threshold, then it can be assumed that such temperature difference is indicative of a tire radius mismatch that should be addressed. The temperature difference may be determined from average temperature values or by selected ones of the temperature values from the respective tires 119 as mentioned above.

It should be noted that the predefined temperature difference threshold itself is specified so as to provide a reliable indication that a tire radius mismatch exists that should be addressed. The actual value of the predefined temperature difference threshold may be determined, for example, by taking actual measurements of temperature values from tires 119 in controlled settings in which a known tire mismatch exists and specifying a predefined temperature difference threshold based on the temperature differentials experienced.

Assuming that a temperature differential exists between the respective tires 119 on a dual wheel hub 120 that is greater than the predefined temperature difference threshold, then the process proceeds to box 233 in which an indication that a tire radius mismatch exists between the respective tires 119 mounted on the dual wheel hub 120. Note that the indication may be stored in association with the respective tires 119 mounted on the dual wheel hub 120 for a given trailer or tractor as can be appreciated. To this end, the indication of a tire mismatch may be stored relative to identifiers used to maintain data for individual tractors/trailers as can be appreciated. Thereafter, the process ends.

Assuming, however, that it is determined that a temperature differential from the respective tires 119 on a dual wheel hub 120 is less than the predefined temperature difference threshold in box 229, then the process proceeds to box 236 to identify the next pair of tires 119 mounted on a dual wheel hub 120 for consideration. The process then reverts back to box 223 to perform the evaluation of the next pair of tires 119 for a tire radius mismatch. In this manner, the process can be applied repeatedly to all pairs of tires 119 mounted on dual wheel hubs 120 in the fleet over time to detect tire radius mismatches in the fleet so that corrective action can be taken as necessary to eliminate the tire radius mismatches. As such, the fuel consumption is improved among the vehicles 113 that use the fleet of tires 119 and the tires 119 themselves are not subjected to undue wear.

Referring next to the portion of the tire mismatch system 129 depicted in FIG. 9B, the process determines in box 243 whether a user interface 149 (FIG. 1) has been requested from a client device 111 (FIG. 1). If so, then in box 246, a user interface is encoded for display that includes an indication of a tire radius mismatch if such mismatch exists in the fleet of tires 119 depicted. Next, in box 249 the encoded user interface is sent to the client 111 to be rendered on a display. Thereafter, the process ends as shown.

Figure 10:
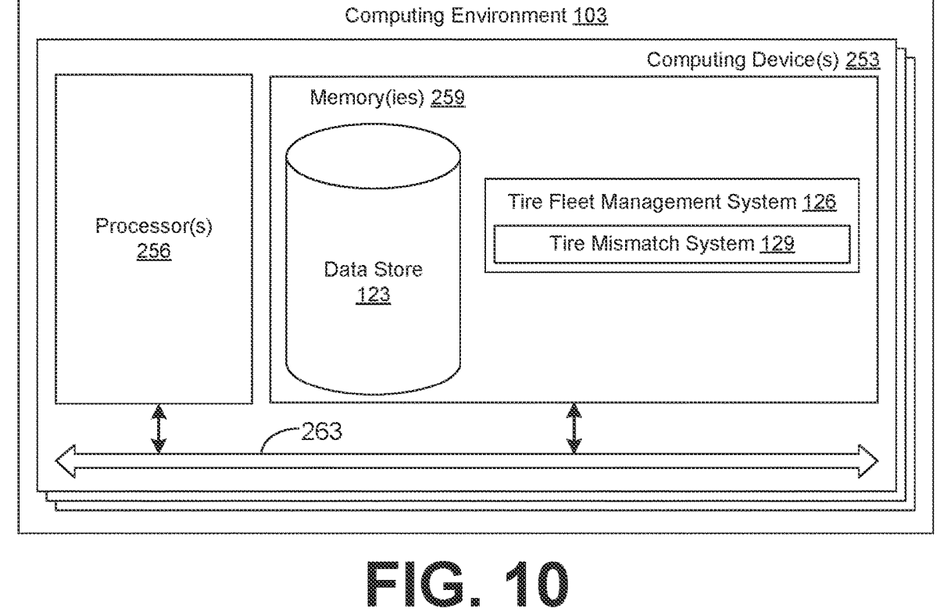
FIG. 10 shows an example of the computing environment of FIG. 1 according to various embodiments of the present disclosure.

With reference to FIG. 10, shown is a schematic block diagram of the computing environment 103 according to an embodiment of the present disclosure. The computing environment 103 includes one or more computing devices 253. Each computing device 253 includes at least one processor circuit, for example, having a processor 256 and a memory 259, both of which are coupled to a local interface 263. To this end, each computing device 253 may comprise, for example, at least one server computer or like device. The local interface 263 may comprise, for example, a data bus with an accompanying address/control bus or other bus structure as can be appreciated.

Stored in the memory 259 are both data and several components that are executable by the processor 256. In particular, stored in the memory 259 and executable by the processor 256 may be the tire fleet management system 126 (FIG. 1) that includes the tire mismatch system 129 (FIG. 1), and potentially other applications. Also stored in the memory 259 may be a data store 123 and other data. In addition, an operating system may be stored in the memory 259 and executable by the processor 256.

It is understood that there may be other applications that are stored in the memory 259 and are executable by the processor 256 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in a memory 259 and are executable by a processor 256. In this respect, the term "executable" means a program file that is in a form that can ultimately be run by the processor 256. Examples of executable programs may be, for example, a compiled program that can be translated into machine code in a format that can be loaded into a random access portion of the memory 259 and run by the processor 256, source code that may be expressed in proper format such as object code that is capable of being loaded into a random access portion of the memory 259 and executed by the processor 256, or source code that may be interpreted by another executable program to generate instructions in a random access portion of the memory 259 to be executed by the processor 256, etc. An executable program may be stored in any portion or component of the memory 259 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

Each of the memories 259 is defined herein as including both volatile and nonvolatile memory and data storage components. Volatile components are those that do not retain data values upon loss of power. Nonvolatile components are those that retain data upon a loss of power. Thus, each memory 259 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, for each computing device 253, the processor 256 may represent multiple processors 256 and/or multiple processor cores and the memory 259 may represent multiple memories 259 that operate in parallel processing circuits, respectively. In such a case, the local interface 263 may be an appropriate network that facilitates communication between any two of the multiple processors 256, between any processor 256 and any of the memories 259, or between any two of the memories 259, etc. The local interface 263 may comprise additional systems designed to coordinate this communication, including, for example, performing load balancing. The processor 256 may be of electrical or of some other available construction.

Although the tire fleet management system 126 that includes the tire mismatch system 129 and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 8, 9A, and 9B show the functionality and operation of an implementation of portions of the tire mismatch system 129. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 256 in a computer system or other system. The machine code may be converted from the source code, etc. If embodied in hardware, each block may represent a circuit or a number of interconnected circuits to implement the specified logical function(s).

Although the flowcharts of FIGS. 8, 9A, and 9B show a specific order of execution, it is understood that the order of execution may differ from that which is depicted. For example, the order of execution of two or more blocks may be scrambled relative to the order shown. Also, two or more blocks shown in succession in FIGS. 8, 9A, and 9B may be executed concurrently or with partial concurrence. Further, in some embodiments, one or more of the blocks shown in FIGS. 8, 9A, and 9B may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the tire fleet management system 126 that includes the tire mismatch system 129, that comprises software or code can be embodied in any non-transitory computer-readable medium for use by or in connection with an instruction execution system such as, for example, a processor 256 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the tire fleet management system 126 that further includes the tire mismatch system 129, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 253, or in multiple computing devices in the same computing environment 103. Additionally, it is understood that terms such as "application," "service," "system," "engine," "module," and so on may be interchangeable and are not intended to be limiting.

Figure 11:
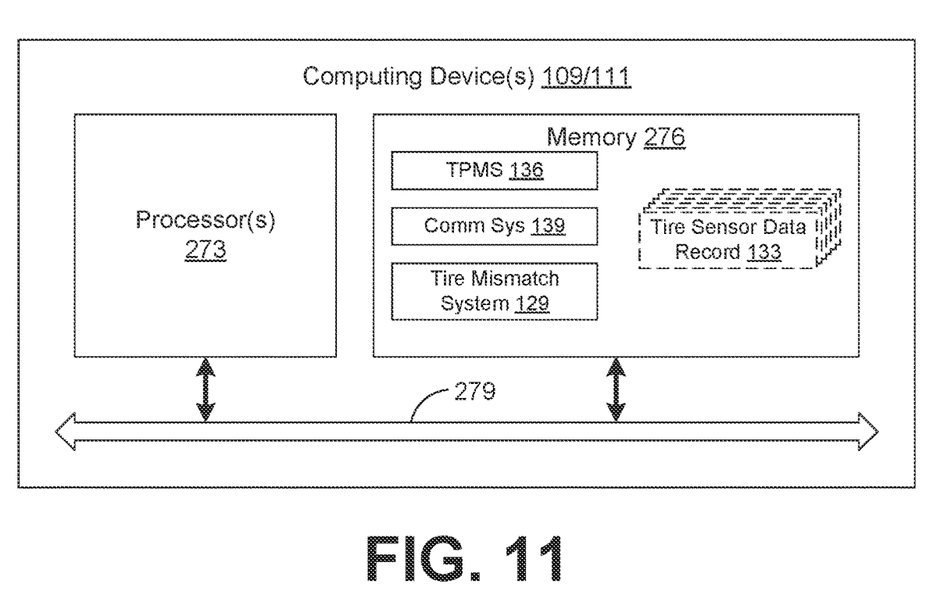
FIG. 11 shows an example of computing devices depicted in FIG. 1 according to various embodiments of the present disclosure.

With reference to FIG. 11, shown is a schematic block diagram that provides an illustration of the computer devices 109 or 111 according to an embodiment of the present disclosure. The computing device 109/111 includes at least one processor circuit, for example, having a processor 273 and a memory 276, both of which are coupled to a local interface 279. To this end, each computing device 109/111 may comprise, for example, a processor-based device or like device. The local interface 279 may comprise, for example, a data bus with an accompanying address/control bus or other bus structure as can be appreciated.

Stored in the memory 276 are both data and several components that are executable by the processor 273. In particular, in the case of the computing device 109, stored in the memory 276 and executable by the processor 273 may be the TPMS 136 (FIG. 1), communication system 139 (FIG. 1), the tire mismatch system 129 (FIG. 1), and potentially other applications. Also, the tire sensor data records 133 are stored in the memory 276. In the case of the computing device 111, the fleet management interface application 143 (not shown) and potentially other applications may be stored in the memory 276 and executable by the processor 273. Generally, the aspects of the computing device(s) 253 set forth above also apply to the computing device 109 or 111 to the extent applicable.

In the present disclosure, disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
   at least one processor circuit with a memory comprising a plurality of instructions, wherein when executed by the processor circuit, the instructions cause the at least one processor circuit to at least:
      access a plurality of first temperature values of a first tire and a plurality of second temperature values of a second tire, the first tire being positioned adjacent to the second tire on a dual wheel hub;
      detect whether a tire radius difference exists between a first radius of the first tire and a second radius of the second tire based on the first and second temperature values; and
      encoding for display an indication that a tire radius mismatch exists between the first and second tires.

2. The system of claim 1, wherein the detection of whether the tire radius difference exists between a first radius of the first tire and a second radius of the second tire based on the first and second temperature values further comprises:
   identifying a segment of travel of the first and second tires in which an amount of heat generated due to a factor external to a free rotation of the first and second tires is substantially minimized, and the first and second temperature values are generated while the first and second tires are in transit in the segment of travel; and
   determining whether a difference between one of the first temperature values and one of the second temperature values is at least as great as a predefined temperature difference threshold.

3. The system of claim 2, wherein the predefined temperature difference threshold is determined relative to a baseline temperature differential.

4. The system of claim 1, wherein the detection of whether the tire radius difference exists between a first radius of the first tire and a second radius of the second tire based on the first and second temperature values further comprises:

identifying a segment of travel of the first and second tires in which an amount of heat generated due to a factor external to a free rotation of the first and second tires is substantially minimized, and the first and second temperature values are generated while the first and second tires are in transit in the segment of travel; and determining whether a difference between an average of the first temperature values and an average of the second temperature values is at least as great as a predefined temperature difference threshold.

5. The system of claim 1, wherein the detection of whether the tire radius difference exists between a first radius of the first tire and a second radius of the second tire based on the first and second temperature values further comprises:

identifying a segment of travel of the first and second tires in which an amount of heat generated due to a factor external to a driven rotation of the first and second tires is substantially minimized, and the first and second temperature values are generated while the first and second tires are in transit in the segment of travel; and determining whether a difference between one of the first temperature values and one of the second temperature values is at least as great as a predefined temperature difference threshold.

6. The system of claim 1, wherein the detection of whether the tire radius difference exists between a first radius of the first tire and a second radius of the second tire based on the first and second temperature values further comprises:

processing the first and second temperature values to minimize an effect of a factor external to a free rotation of the first and second tires on a temperature of the first and second tires; and determining whether a difference between a processed one of the first temperature values and a processed one of the second temperature values is at least as great as a predefined temperature difference threshold.

7. The system of claim 1, wherein the detection of whether the tire radius difference exists between a first radius of the first tire and a second radius of the second tire based on the first and second temperature values further comprises:

processing the first and second temperature values to minimize an effect of a factor external to a driven rotation of the first and second tires on a temperature of the first and second tires; and determining whether a difference between a processed one of the first temperature values and a processed one of the second temperature values is at least as great as a predefined temperature difference threshold.

8. The system of claim 1, wherein the first temperature values are generated by a first temperature sensor associated with the first tire, and the second temperature values are generated by a second temperature sensor associated with the second tire.

9. The system of claim 1, wherein the instructions further cause the at least one processor circuit to render the indication that the tire radius mismatch exists between the first and second tires on a display device.

10. The system of claim 1, further comprising:

a gateway device associated with the first and second tires;

wherein the first and second temperature values are stored in the gateway device; and the instructions further cause the at least one processor circuit to communicate with the gateway device through a network to obtain the first and second temperature values.

11. The system of claim 10, wherein the first temperature values are generated by a first temperature sensor associated with the first tire, and the second temperature values are generated by a second temperature sensor associated with the second tire, and the gateway device is in wireless communication with the first and second temperature sensors and the gateway device obtains the first and second temperature values from the first and second temperature sensors.

12. The system of claim 1, wherein the first temperature values are generated by a first temperature sensor associated with the first tire, and the second temperature values are generated by a second temperature sensor associated with the second tire, and the at least one processor circuit is included in a gateway device, the gateway device being in wireless communication with the first and second temperature sensors and the gateway device obtaining the first and second temperature values from the first and second temperature sensors.

13. A system, comprising:

at least one processor circuit with a memory comprising a plurality of instructions, wherein when executed by the processor circuit, the instructions cause the at least one processor circuit to at least:

identify a time period in which a difference between a first radius of a first tire and a second radius of a second tire is known to be less than a maximum allowable difference threshold, the first and second tires being mounted on a dual wheel hub;

identifying a segment of travel of the first and second tires occurring within the time period in which an amount of heat generated in the first and second tires due to a factor external to a free rotation of the first and second tires is substantially minimized;

determining a first baseline temperature value for the first tire based on a plurality of first temperature values from the first tire, the first temperature values being generated during the segment of travel; and determining a second baseline temperature value for the second tire based on a plurality of second temperature values from the second tire, the second temperature values being generated during the segment of travel.

14. A system, comprising:

at least one processor circuit with a memory comprising a plurality of instructions, wherein when executed by the processor circuit, the instructions cause the at least one processor circuit to at least:

identify a time period in which a difference between a first radius of a first tire and a second radius of a second tire is known to be less than a maximum allowable difference threshold, the first and second tires being mounted on a dual wheel hub of a tractor;

identifying a segment of travel of the first and second tires occurring within the time period in which an amount of heat generated in the first and second tires due to a factor external to a driven rotation of the first and second tires is substantially minimized;

determining a first baseline temperature value for the first tire based on a plurality of first temperature values from the first tire, the first temperature values being generated during the segment of travel; and determining a second baseline temperature value for the second tire based on a plurality of second temperature values from the second tire, the second temperature values being generated during the segment of travel.

\* \* \* \* \*